US010344407B2

(12) United States Patent
Sufer et al.

(10) Patent No.: US 10,344,407 B2

(45) Date of Patent: Jul. 9, 2019

(54) INTERACTIVE LOOM

(71) Applicant: WOWWEE GROUP LTD., Hong Kong (HK)

(72) Inventors: Davin Sufer, Montreal (CA); Anthony Lemire, Montreal (CA)

(73) Assignee: WOWWEE GROUP LTD., Hong Kong (HK)

( * ) Notice: Subject to any disclaimer, the term of this patent is extended or adjusted under 35 U.S.C. 154(b) by 128 days.

(21) Appl. No.: 15/786,285

(22) Filed: Oct. 17, 2017

(65) Prior Publication Data

US 2018/0105961 A1 Apr. 19, 2018

Related U.S. Application Data

(60) Provisional application No. 62/409,403, filed on Oct. 18, 2016.

(51) Int. Cl.

*D03C 5/02* (2006.01)
*D03J 1/00* (2006.01)

(Continued)

(52) U.S. Cl.

CPC .......... *D03J 1/005* (2013.01); *A63H 33/3088* (2013.01); *D03C 3/20* (2013.01);

(Continued)

(58) Field of Classification Search

CPC ... D03C 1/00; D03C 1/12; D03C 5/02; D03C 2700/0133; D03C 5/00; D03D 41/005;

(Continued)

(56) References Cited

U.S. PATENT DOCUMENTS

| | | | | |
|---|---|---|---|---|
| 3,570,547 A * | 3/1971 | Burgess | D03D 49/06 | 139/25 |
| 3,601,393 A * | 8/1971 | Hawley | A41H 42/00 | 198/375 |

(Continued)

OTHER PUBLICATIONS

YAYOMG.com, "6 Reasons i-loom is Completely Awesome", https://www.yayomg.com/i-loom/, retrieval date: Jan. 4, 2018.

*Primary Examiner* — Robert H Muromoto, Jr.

(74) *Attorney, Agent, or Firm* — Merchant & Gould P.C.

(57) ABSTRACT

An interactive loom, which includes a loom-mechanism, a user interface, a loom interface, and a controller. Each cam is in the form of a cylinder rotating about the axis thereof. The circumferential surface of the cam exhibits a determined surface geometry, such that each of a plurality of sections of said circumferential surface corresponds to a respective one of the arms. The circumferential surface further exhibits a respective cross sectional profile and such that each rotational position of said cam is associated with a respective state of lowered and raised arms. The loom-interface includes a motor coupled with the cam, and operates loom-mechanics according to instructions. The controller receives a design from the user-interface and transforms the design into a sequence of states of the arms required for achieving the design. The controller further provides the instructions to the loom-interface. The instructions are associated with state changes of the arms.

9 Claims, 8 Drawing Sheets

(51) Int. Cl.

| | |
|---|---|
| ***G05B 19/042*** | (2006.01) |
| ***D03D 51/00*** | (2006.01) |
| ***D03D 51/02*** | (2006.01) |
| ***A63H 33/30*** | (2006.01) |
| ***D03C 3/20*** | (2006.01) |
| ***D03C 19/00*** | (2006.01) |
| ***D03D 29/00*** | (2006.01) |
| *D03C 5/00* | (2006.01) |

(52) U.S. Cl.
CPC .......... *D03C 19/005* (2013.01); *D03D 29/00* (2013.01); *D03D 51/007* (2013.01); *D03D 51/02* (2013.01); *G05B 19/0421* (2013.01)

(58) Field of Classification Search
CPC ...... D03D 47/00; D03D 47/275; D03D 47/38; D03D 2700/101; D03D 35/00
See application file for complete search history.

(56) References Cited

U.S. PATENT DOCUMENTS 3,665,970 A * 5/1972 Porter .................... D03D 47/00 139/20
3,730,232 A * 5/1973 Kleiner .................... D03C 1/00 139/331
3,771,572 A * 11/1973 Gross ..................... D03D 35/00 139/136
3,807,460 A * 4/1974 Alexandr ................. D03C 1/12 139/76
3,915,199 A * 10/1975 Kida .................... D03D 47/361 139/452
4,074,729 A * 2/1978 Mizuno .................. D03D 47/38 139/450
4,122,872 A * 10/1978 McGinley ............ D03D 41/005 139/460
2006/0236797 A1* 10/2006 Debaes .................... D03C 5/02 74/63

* cited by examiner

INTERACTIVE LOOM

FIELD OF THE DISCLOSED TECHNIQUE

The disclosed technique relates to looms in general, and to an interactive loom in particular.

BACKGROUND OF THE DISCLOSED TECHNIQUE

Toy interactive looms enable a user to create a selected design of a woven bracelet. I-loom is an example of a toy loom which is known in the art. I-loom includes a frame in which a tablet computer is placed. A bracelet holder is placed on top of the tablet computer and is attached to the frame. Threads are pulled between the bracelet holder and the frame. The tablet computer includes software which instructs the user how to interlace the threads to create the design.

SUMMARY OF THE PRESENT DISCLOSED TECHNIQUE

It is an object of the disclosed technique to provide a novel interactive loom. In accordance with the disclosed technique, there is thus provided an interactive loom which includes a loom mechanism, a user interface, a loom interface, and a controller. The loom interface is coupled with the loom mechanism. The controller is coupled with the user interface and with the loom interface. The loom mechanism includes a plurality or arms coupled with at least one cam. Each of the at least one cam is in the form of a cylinder rotating about the axis thereof. The circumferential surface of the cam exhibits a determined surface geometry, such that each of a plurality of sections of said circumferential surface corresponds to a respective one of the arms. The circumferential surface further exhibits a respective cross sectional profile and such that each rotational position of said cam is associated with a respective state of lowered and raised arms. The user interface receives designs from a user. The loom interface at least includes a motor coupled with the cam. The loom interface operates the loom mechanics according to received instructions. The controller receives the design from the user interface and transforms the design into a sequence of states of the arms required for achieving the design. The controller further provides the instructions to the loom interface. The instructions are associated with state changes of the arms.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing an interactive loom for producing desired designs. The loom includes a plurality of arms, which sequentially raise and lower selected threads according to a sequence corresponding to a desired design. At each step of the sequence, the user pulls another thread, which is connected to a shuttle, under the raised threads and over the lowered threads and around a backer. The thread attached to the shuttle is referred to herein as the 'shuttle thread'.

Figure 1:
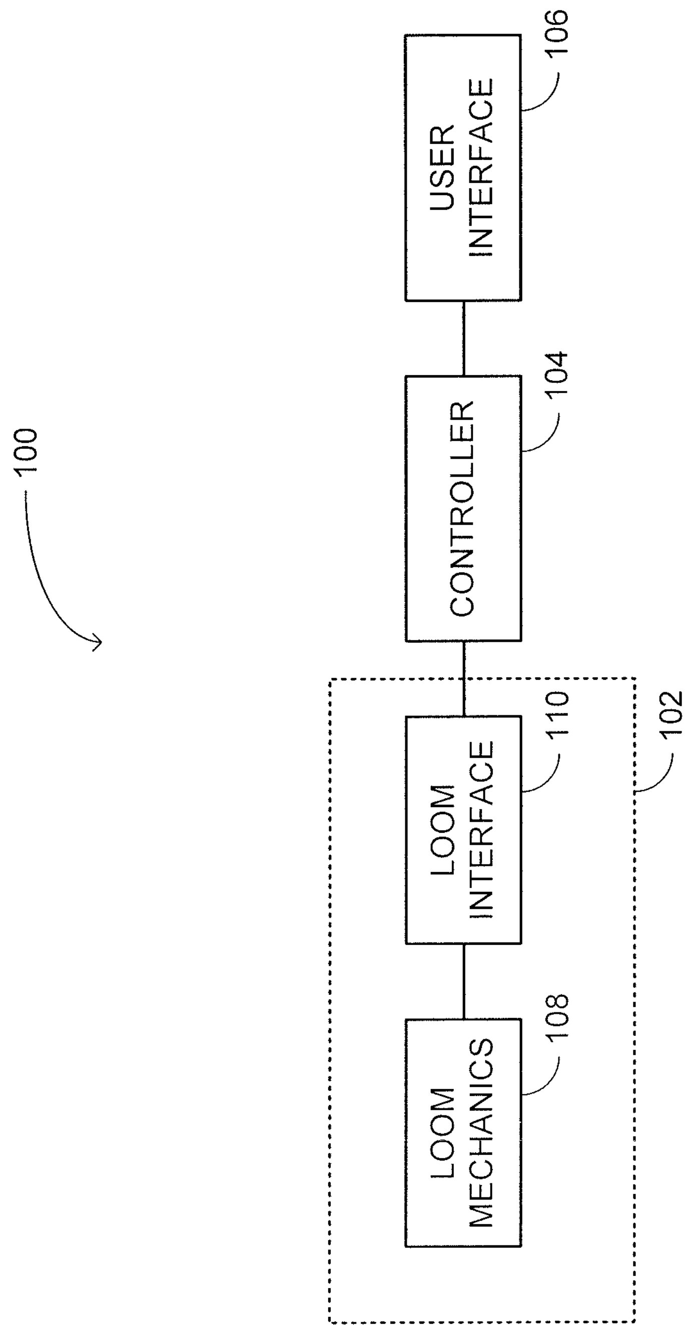
FIG. 1 is a schematic illustration of an interactive loom system, constructed and operative in accordance with an embodiment of the disclosed technique.

Reference is now made to FIG. 1, which is a schematic illustration of an interactive loom system, generally referenced 100, constructed and operative in accordance with an embodiment of the disclosed technique. Loom system 100 includes a loom 102, a controller 104 and a user interface 106. Loom 102 includes loom mechanics 108 and loom interface 110. Loom interface 110 is coupled with loom mechanics 108 and with controller 104. Controller 104 is further coupled with user interface 106.

Loom interface 110 operates loom mechanics 108 according to instructions received from controller 104 and includes, for example, a motor or motors and circuitry (e.g., H-bridges) for controlling such motors. Loom mechanics 108 includes gears, wheels and arms. The arms raise or lower respective threads according to a sequence corresponding to the desired design and the user pulls a shuttle with the shutter thread connected thereto under the raised threads and over the lowered threads and wraps the shuttle thread around a backer as further explained below. Loom mechanics and the operation thereof are further explained below.

When a user wants to produce a design, the user creates the desired design via user interface 106. User interface 106 may be for example a portable hand held device (e.g., a smartphone, a tablet computer) or a computer (e.g., a desktop computer, a laptop computer), which includes a user interface software enabling the user to create designs. In such case, the user interface 106 may be wirelessly coupled with controller 104. User interface 106 provides the design to controller 104. Controller 104 receives a design from user interface 106 and transforms this design into a sequence of states of the arms required for achieving the design. User interface 106 may indicate to the user, for example, with arrowed shaped lights or color coded lights, the direction in which the user should pull the shuttle while passing through the lower and raised threads. According to one example, when color coded lights are employed the user should pass the shuttle from a green light toward a red light. The user indicates to controller 104, either via user interface 106 or via a button on loom 102, when the user completed a step in the design. Controller 104 then instructs loom interface 110 to position the arms at the next state of the design. Loom interface 110 operates loom mechanics 108 according to the instructions provided by controller 104. It is noted that controller 104 may be incorporated in the device which incorporates user interface 106 or in loom 102.

Figure 2:
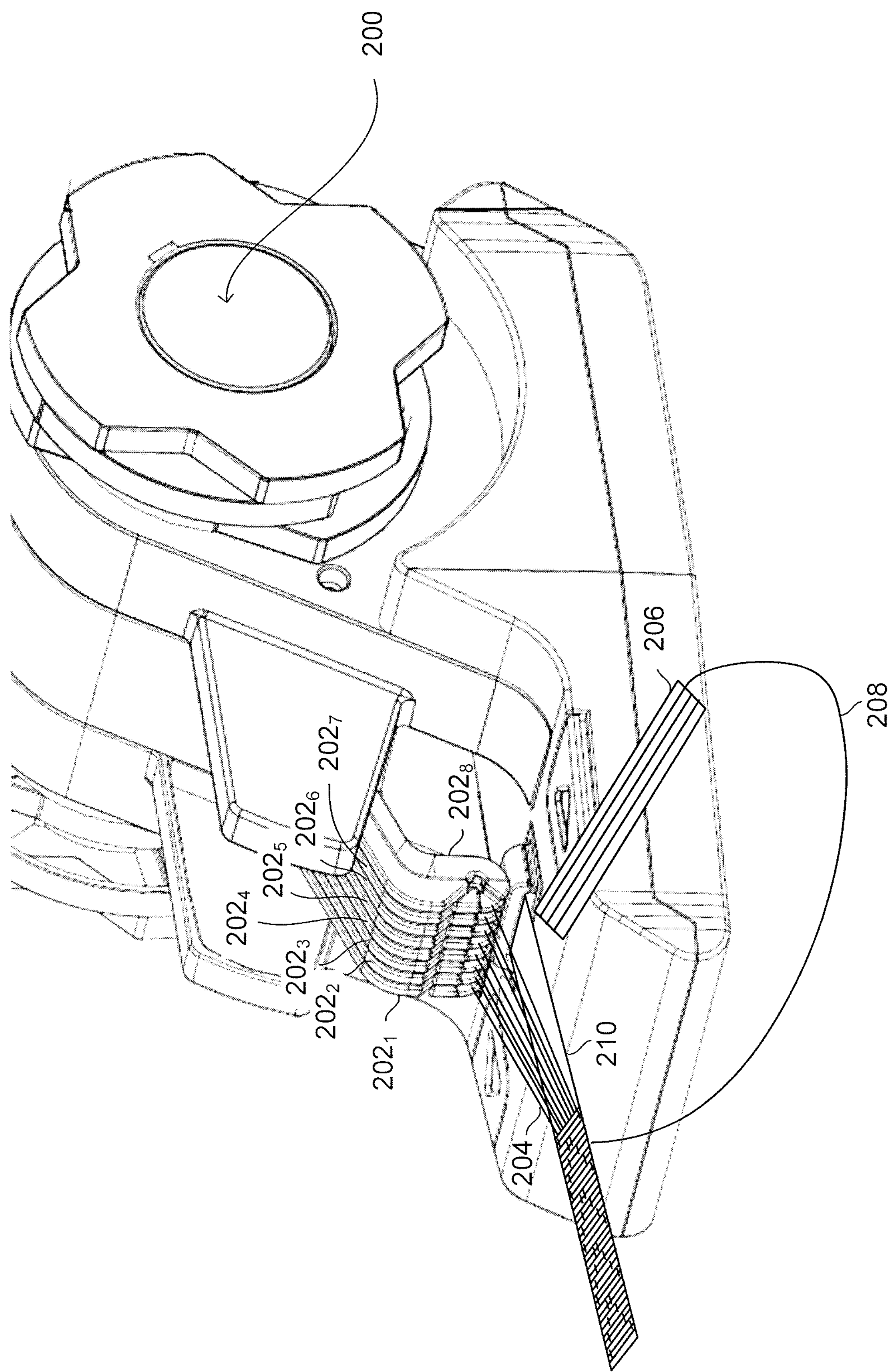
FIG. 2 is a schematic illustration of an exemplary interactive loom, constructed and operative in accordance with another embodiment of the disclosed technique.

Reference is now made to FIG. 2, which is a schematic illustration of an exemplary loom, generally referenced 200, constructed and operative in accordance with another embodiment of the disclosed technique. Loom 200 includes eight arms $\mathbf{200}_1$-$\mathbf{200}_8$ for raising selected threads, such as thread 204. Loom 200 raises the selected threads according to the design and the user pulls a shuttle 206 of another thread 208 under the raised threads and over the ones that are not raised and around a backer 210. In FIG. 2, arms $\mathbf{202_1}$-$\mathbf{202_8}$ are lowered. To achieve, for example, the design shown in FIG. 2, arms $\mathbf{202_1}$ and $\mathbf{202_8}$ are raised. A user pulls a shuttle 206 and thread 208 under the threads corresponding to arms $\mathbf{202_1}$, $\mathbf{202_8}$ and over the threads corresponding to arms $\mathbf{202_2}$, $\mathbf{202_3}$, $\mathbf{202_4}$, $\mathbf{202_5}$, $\mathbf{202_6}$, $\mathbf{202_7}$ and then under backer 210. Then, arms $\mathbf{202_1}$ and $\mathbf{202_8}$ are lowered and arms $\mathbf{202_2}$ and $\mathbf{202_7}$ are raised. The user pulls shuttle 206 and thread 208 under the threads corresponding to arms $\mathbf{202_2}$, $\mathbf{202_7}$ and over the threads corresponding to arms $\mathbf{202_1}$, $\mathbf{202_3}$, $\mathbf{202_4}$, $\mathbf{202_5}$, $\mathbf{202_6}$, $\mathbf{202_8}$ and then under backer 210. Thereafter, arms $\mathbf{202_2}$ and $\mathbf{202_7}$ are lowered and arms $\mathbf{202_3}$ and $\mathbf{202_6}$ are raised. The user pulls shuttle 206 and thread 208 under the threads corresponding to arms $\mathbf{202_3}$, $\mathbf{202_6}$ and over the threads corresponding to arms $\mathbf{202_1}$, $\mathbf{202_2}$, $\mathbf{202_4}$, $\mathbf{202_5}$, $\mathbf{202_7}$, $\mathbf{202_8}$ and then under backer 210. Then arms $\mathbf{202_3}$ and $\mathbf{202_6}$ are lowered and arms $\mathbf{202_4}$ and $\mathbf{202_5}$ are raised. The user pulls shuttle 206 and thread 208 under the threads corresponding to arms $\mathbf{202_4}$, $\mathbf{202_5}$ and over the threads corresponding to arms $\mathbf{202_1}$, $\mathbf{202_2}$, $\mathbf{202_3}$, $\mathbf{202_6}$, $\mathbf{202_7}$, $\mathbf{202_8}$ and then under backer 210. This process is repeated along the length of backer 210. In general, by sequentially raising selected ones of threads $\mathbf{202_1}$-$\mathbf{202_8}$ according to a sequence corresponding to the desired design, and pulling shuttle 206 and thread 208 under the raised threads and over the lowered threads at each step of the sequence, the desired design is achieved.

Figure 3A:
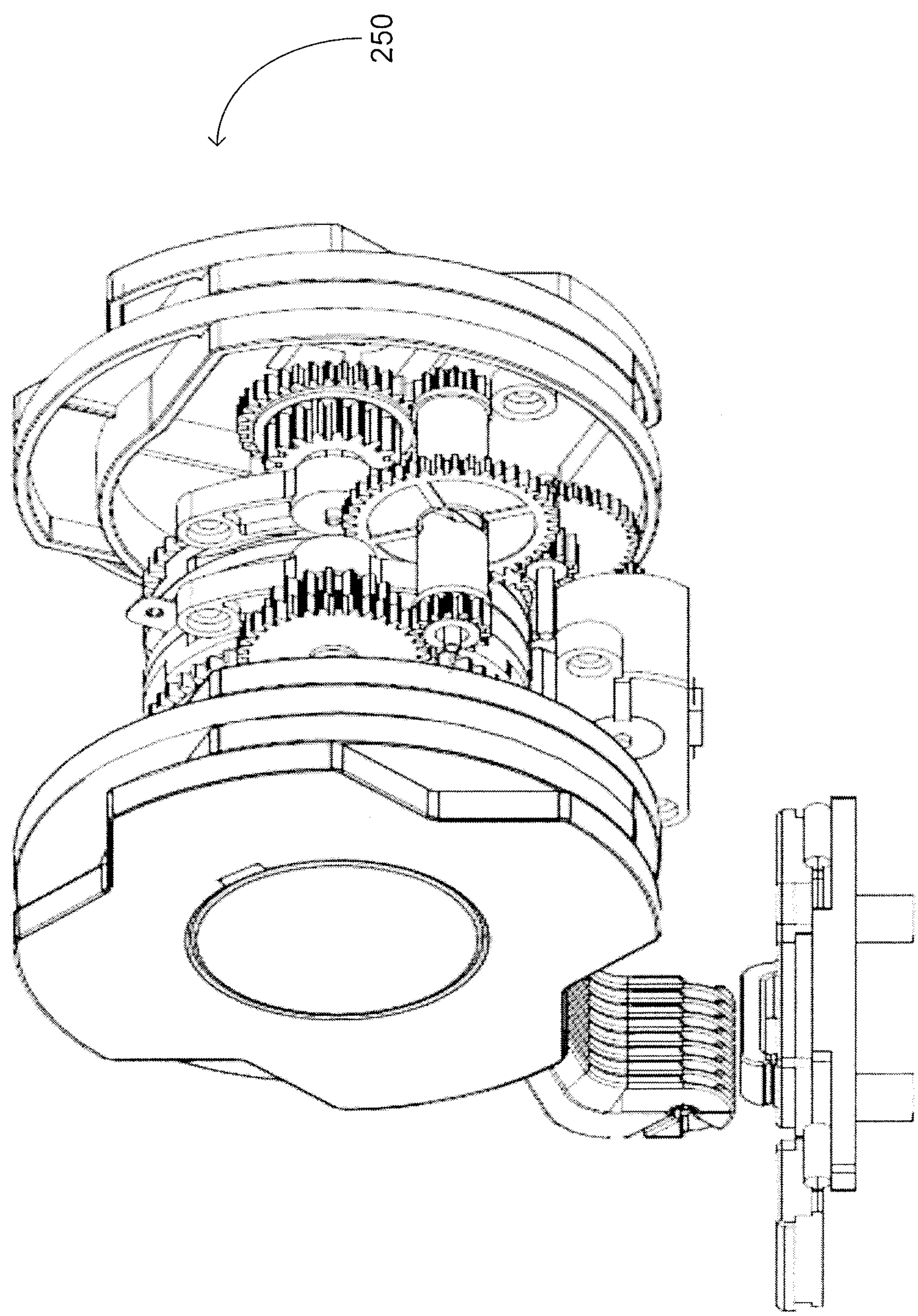
FIGS. 3A-3D are schematic illustrations of the mechanics of an interactive loom, constructed and operative in accordance with a further embodiment of the disclosed technique.
Figure 3B:
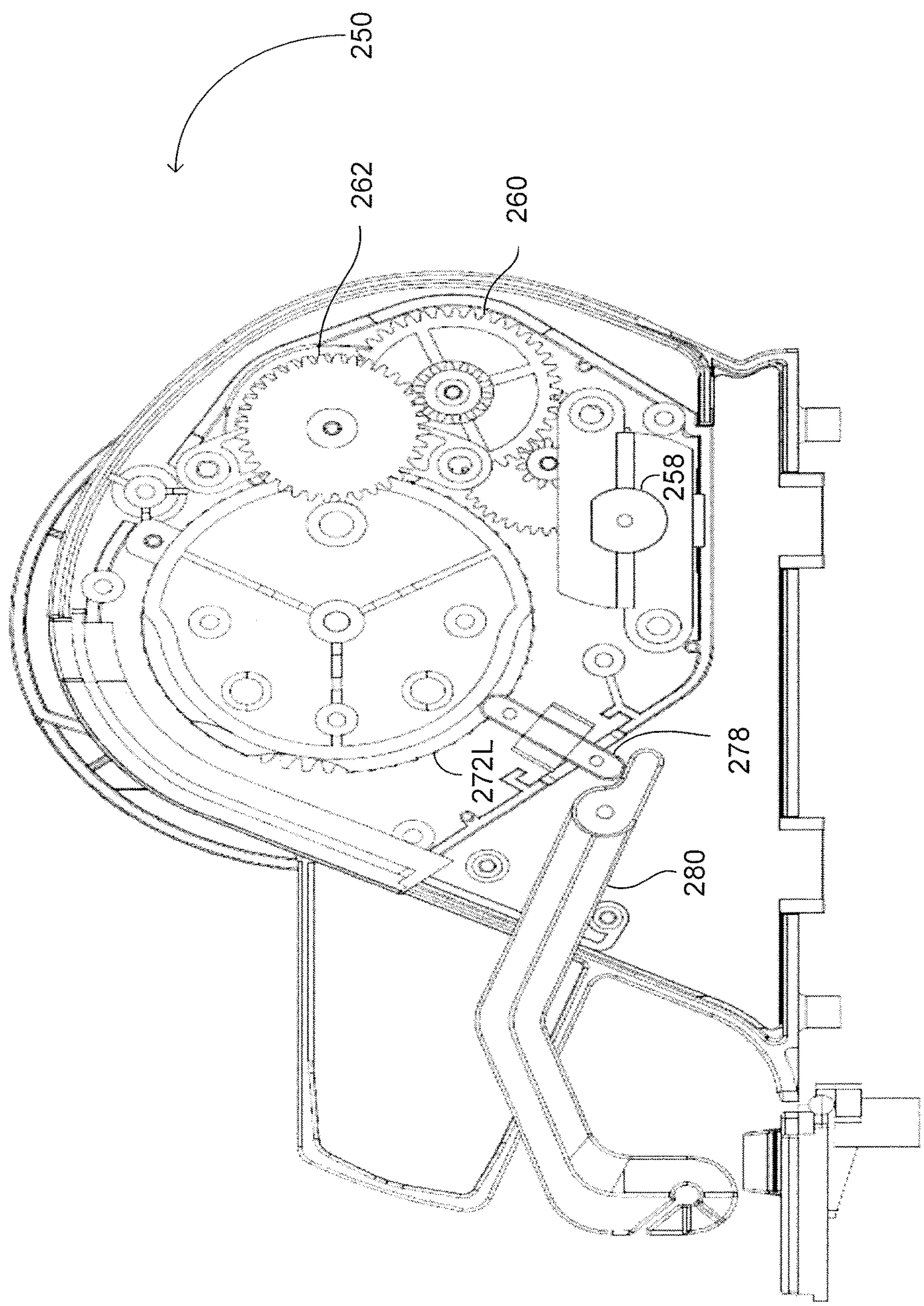
Figure 3C:
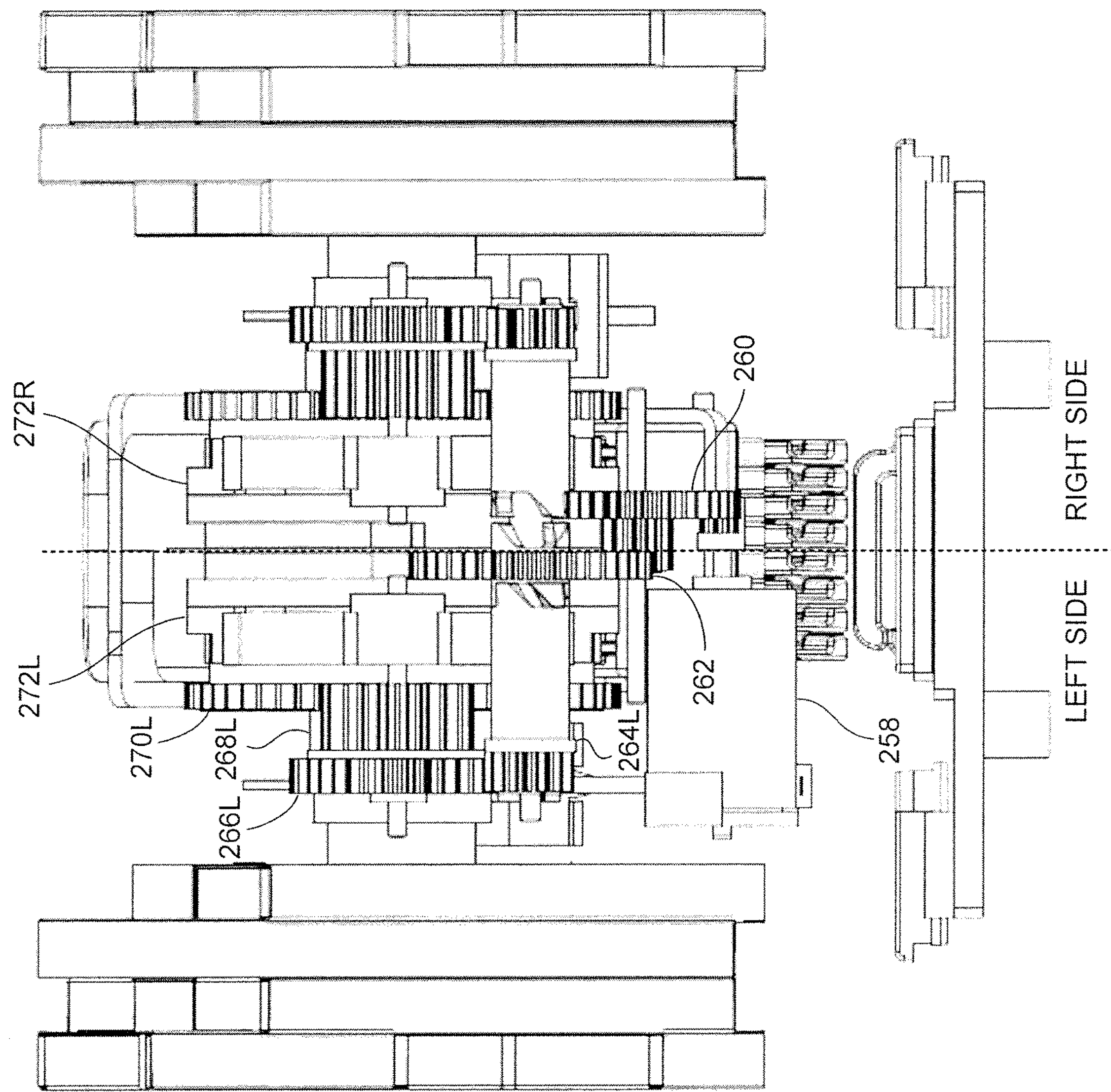
Figure 3D:
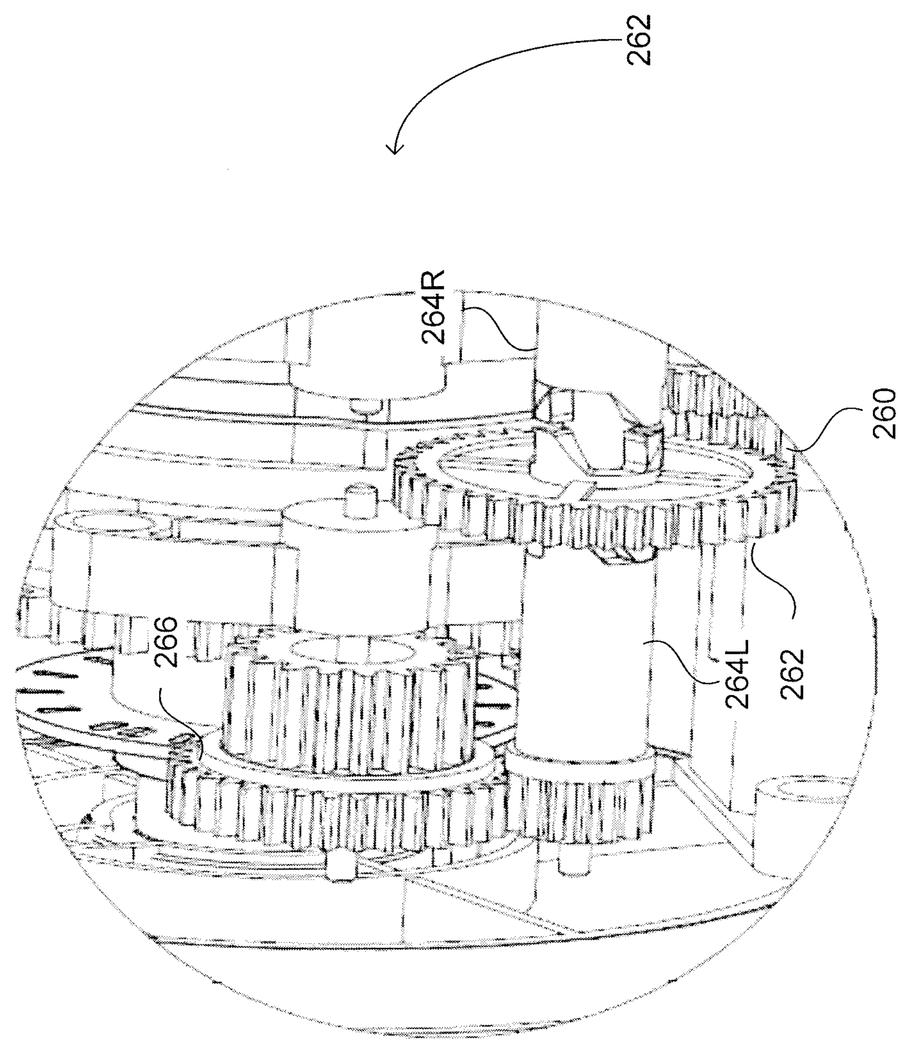
Figure 4B:
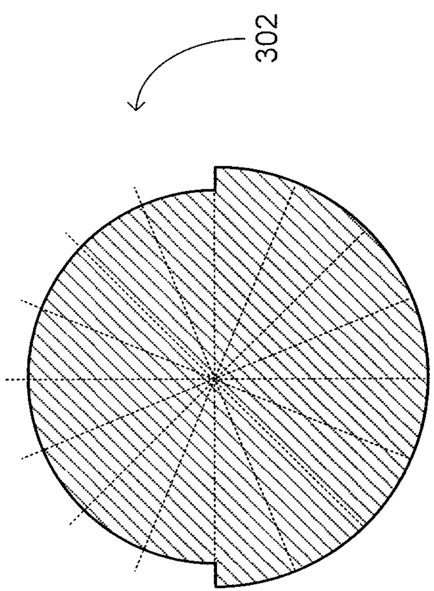
FIGS. 4A-4D are schematic illustrations of lateral cross sections of a cam in an interactive loom, in accordance with another embodiment of the disclosed technique.
Figure 4D:
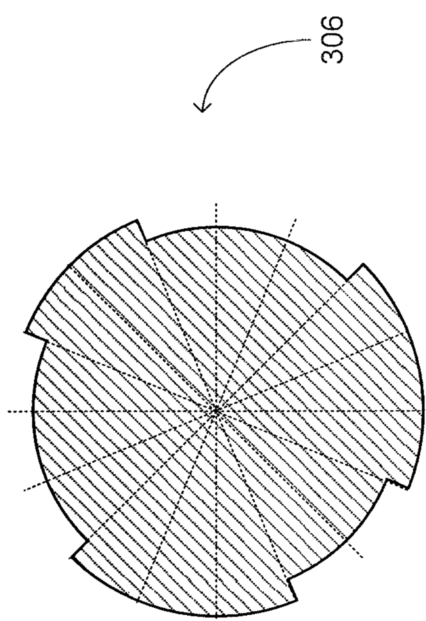
Figure 4A:
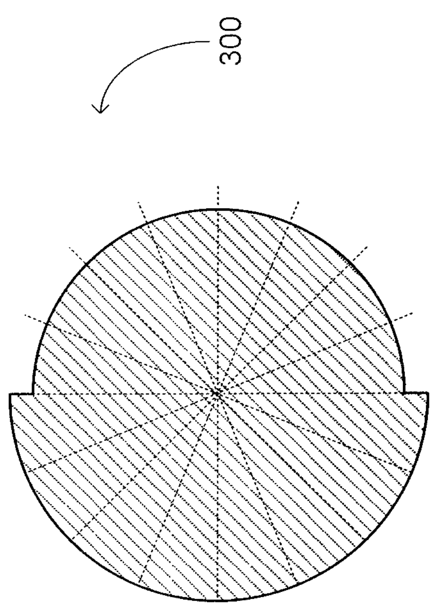
Figure 4C:
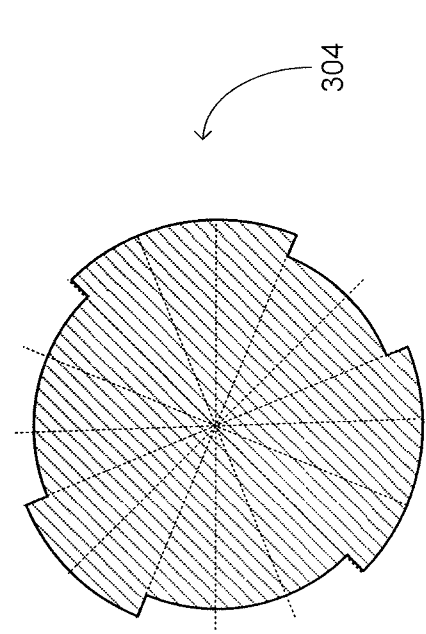

Reference is now made to FIGS. 3A-3D, which are schematic illustrations of the mechanics of an interactive loom, generally referenced 250, constructed and operative in accordance with a further embodiment of the disclosed technique. FIG. 3A, is an isometric view of loom mechanics 250, FIG. 3B is a side view of loom mechanics 250, FIG. 3C is a back view of loom mechanics 250 and FIG. 3D is view of double sided gear 260 in loom mechanics 250.

In general, loom mechanics 250 includes two sides, the left side and the right side (i.e., looking at loom 250 from behind as depicted in FIG. 3C). The operation of both sides is identical. Each side is selected sequentially according to the direction of rotation of motor 258. For the sake of simplicity, the following description relates to the operation of the left side of loom 250.

Gear 260 rotates with motor 258. Gear 260 rotates sliding gear 262. Due to the geometry of sliding gear 262, sliding gear 262 engages with gear 264L, acting as a clutch. Once engaged, gear 264L drives gear 266L, which drives gear 268L which drives gear 270L. Gear 270L is directly linked to left cam 272L. Cam 272L is generally is the form of a cylinder rotating about the axis thereof where the circumferential surface of the cylinder exhibits a determined surface geometry as further explained below. Thus, motor 258 rotates cams 272L and 272R to a rotation position, via sliding gear 262, according to direction of rotation thereof. Cams 272L and 272R raise and lower the corresponding arms (e.g., arms $\mathbf{202_1}$-$\mathbf{202_8}$—FIG. 2) according to the desired design as further explained below. Gear 270L also drives gear 276L, which is coupled with an encoder that indicates when cam 272L reached the determined rotational position.

When loom 250 includes n+m arms (e.g., 8 in FIGS. 2, 3A-3D), cam 272L raises or lowers n arms and 272R raises or lowers m arms (e.g., n and m are equal to 4 in FIGS. 2, 3A-3D). Accordingly, cam 272L is configured for all $2^n$ combinations, also referred to hereinabove and below as states, of lowered or raised arms and cam 242R is configured for all $2^m$ states of lowered or raised arms (e.g., 16 possibilities in FIGS. 2, 3A-3D). Cams 272L and 272R exhibit a specific surface geometry such that at each of $2^L$ (i.e., L is one of n or m) rotational positions is associated with a respective state of lowered or raised arms as further explained below. In other words the surface geometry defines which arms are raised or lowered. At each of $2^L$-1 positions, each one of cams 272L and 272R pushes on at least one of linear translators, such as linear translator 278, which slide down a respective channels and push on respective arms such as arm 280 and raises them. At one of the positions, all the arms a lowered (i.e., the cam does not push on any of the linear translators). When a linear translator is not pushed upon, the arm corresponding to this linear translator is lowered, for example by the force of gravity or with the aid of a spring. Each linear translator is coupled with a respective arm and in slidable contact with a respective one of cams 272L and 272R as further explained below.

Reference is now made to FIGS. 4A-4D which are schematic illustrations of lateral cross sectional profiles, generally referenced 300, 302, 304 and 306 respectively, of a cam, such as cam 272L (FIG. 3C), in an interactive loom, in accordance with another embodiment of the disclosed technique. Each one of lateral cross sectional profiles 300, 302, 304 and 306 is associated with a respective arm. In FIGS. 4A-4D, the cam either lowers or raises 4 arms. Each linear translator (e.g., linear translator 278—FIG. 3B) is in slidable contact with a respective section of the circumferential surface of the cam corresponding to a respective one lateral cross sectional profiles 300, 302, 304 and 306. In the example brought forth in FIGS. 4A-4D, at each of 1/16 of a turn, each linear translator is either pushed by the cam or is at an initial position, as determined by the geometry of the respective cross section of the cam. In the example brought forth in FIGS. 4A-4D, all 16 states of lowered or raised arms are achieved with the aid of the cam. Specifically in FIGS. 4A-4D, each state differs from an adjacent state by one lowered or raised arm (i.e., the states exhibit Gray coding), thus reducing friction and the number of moving parts at each transition. Thus, a controller (e.g., controller 104—FIG. 1) can determine the rotation of a motor (e.g., motor 258—FIG. 3C) required to change the state of the arms from the current state to the next state of the design and instruct the motor to rotate accordingly (i.e., the instructions provided by the controller is associated with state changes of said arms).

As mentioned above, the arms of the loom are raised or lowered according to a desired design, thereby raising or lowering threads attached thereto. According to another embodiment of the disclosed technique, the threads are inserted into a tab, which in turn is attached to a respective arm. According to a further embodiment, the end section of each arm includes a hook through which the threads are placed.

Figure 5C:
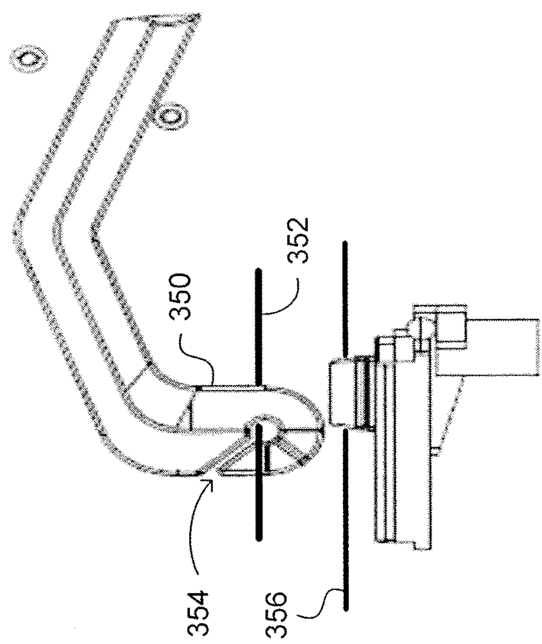
FIGS. 5A, 5B and 5C are schematic illustration of a loom arm, constructed and operative in accordance with a further embodiment of the disclosed technique.
Figure 5B:
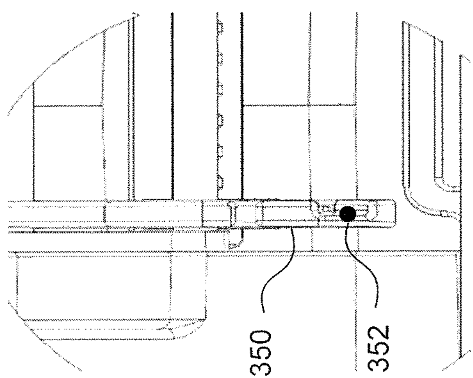
Figure 5A:
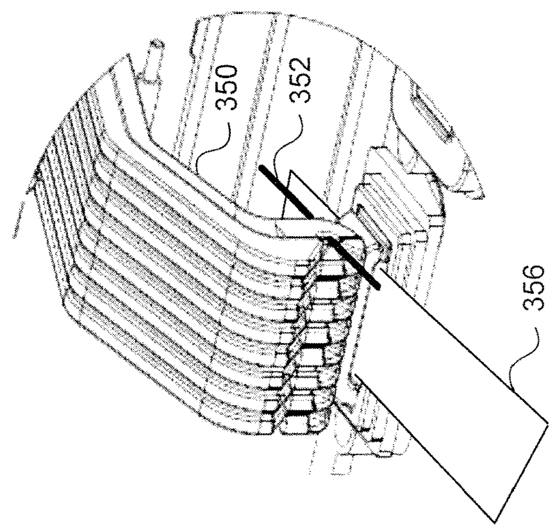

Reference is now made to FIGS. 5A, 5B and 5C, which are schematic illustration of a loom arm, generally referenced 350, constructed and operative in accordance with a further embodiment of the disclosed technique. Arm 350 is in the general shape of the letter 'L' (i.e., a short section and a long section attached at an angle therebetween), where the end of the short section includes a hook. Each thread, such as thread 352, is placed in the opening 354 of that hook. The hook is designed to allow the thread attached thereto to remain in-line with a backer 356 after the thread is inserted through the opening of the hook, effectively locking thread 352 in place so that arm 350 can raise and lower thread 352 without interfering with the other threads and without employing tabs. To release, the user removes thread 352 through the opening 354 of the hook of the arm.

It will be appreciated by persons skilled in the art that the disclosed technique is not limited to what has been particularly shown and described hereinabove. Rather the scope of the disclosed technique is defined only by the claims, which follow.

The invention claimed is:

1. An interactive loom comprising:

loom mechanics including a plurality or arms coupled with at least one cam, each of said at least one cam is in the form of a cylinder rotating about the axis thereof, the circumferential surface of said cam exhibiting a determined surface geometry, such that each of a plurality of sections of said circumferential surface corresponds to a respective one of said arms, said circumferential surface further exhibiting a respective cross sectional profile and such that each rotational position of said cam is associated with a respective state of lowered and raised arms;

a user interface for receiving a design from a user;

a loom interface coupled with said loom mechanics, said loom interface at least including a motor coupled with said cam, said loom interface operating said loom mechanics according to received instructions;

a controller coupled with said user interface and with said loom interface, said controller receiving said design from said user interface and transforming said design into a sequence of states of said arms required for achieving said design, said controller further providing said instructions to said loom interface, said instructions being associated with state changes of said arms.

2. The interactive loom according to claim 1, wherein a thread is attached to each of said arms and a user pulls a shuttle thread under the raised threads and over the lowered threads and around a backer.

3. The interactive loom according to claim 2, wherein said thread is attached to the arm with tabs.

4. The interactive loom according to claim 2, where each arm includes a short section and a long section attached at an angle therebetween, wherein the end of the short section includes a hook, wherein, each thread is placed in the opening of said hook.

5. The interactive loom according to claim 4, wherein said hook is designed to allow the thread attached thereto be to remain in-line with a backer.

6. The interactive loom according to claim 3, wherein said user interface indicates to a user the direction in which said user should pull said shuttle thread.

7. The interactive loom according to claim 1, further including a plurality of linear translators, each coupled with a respective arm and in slidable contact with a respective one of said sections of said circumferential surface of said cam corresponding to said respective one of said cross sectional profiles, and wherein for each of at least a portion of said rotational positions, each of a portion of said linear translators pushes on the respective arms thereof, said portion of linear translators being defined according to said surface geometry.

8. The interactive loom according to claim 1, wherein said at least one cam includes two cams, wherein said loom mechanics further includes a sliding gear coupling each of said cams with said motor, wherein said motor rotates each of said cams to a rotational position, according to direction of rotation of said motor.

9. The interactive loom according to claim 1, further including encoder coupled with said controller, indicating that said cam reached a rotational position.

* * * * *